US009389738B2

(12) United States Patent
Chang et al.

(10) Patent No.: US 9,389,738 B2
(45) Date of Patent: Jul. 12, 2016

(54) TOUCHING APPARATUS AND TOUCHING DETECTING METHOD THEREOF

(71) Applicant: Novatek Microelectronics Corp., Hsinchu (TW)

(72) Inventors: Chih-Yuan Chang, Hsinchu County (TW); Chih-Peng Hsia, Hsinchu County (TW); Hui-Hung Chang, Keelung (TW)

(73) Assignee: Novatek Microelectronics Corp., Hsinchu (TW)

( * ) Notice: Subject to any disclaimer, the term of this patent is extended or adjusted under 35 U.S.C. 154(b) by 168 days.

(21) Appl. No.: 14/056,975

(22) Filed: Oct. 18, 2013

(65) Prior Publication Data
US 2014/0267146 A1 Sep. 18, 2014

(30) Foreign Application Priority Data

Mar. 15, 2013 (TW) .............................. 102109293 A

(51) Int. Cl.
G06F 3/045 (2006.01)
G06F 3/044 (2006.01)
G06F 3/041 (2006.01)

(52) U.S. Cl.
CPC .............. *G06F 3/044* (2013.01); *G06F 3/0418* (2013.01)

(58) Field of Classification Search
CPC ..... G06F 3/044; G06F 3/0416; G06F 3/0418; G06F 2203/04104; G06F 2203/04106
See application file for complete search history.

(56) References Cited

U.S. PATENT DOCUMENTS

| 8,390,597 | B2 * | 3/2013 | Bernstein ...................... 345/174 |
| 8,519,975 | B2 * | 8/2013 | Huang ................. G06F 3/0416 |
| | | | 345/173 |
| 8,570,289 | B2 * | 10/2013 | Chang et al. .................. 345/173 |
| 8,773,146 | B1 * | 7/2014 | Hills et al. ..................... 324/658 |
| 8,810,544 | B2 * | 8/2014 | Liu ......................... G06F 3/044 |
| | | | 178/18.06 |
| 8,933,907 | B2 * | 1/2015 | Hanauer et al. ............... 345/174 |
| 8,970,552 | B2 * | 3/2015 | Chang et al. .................. 345/174 |
| 8,976,151 | B2 * | 3/2015 | Tan et al. ....................... 345/174 |
| 9,007,342 | B2 * | 4/2015 | Grivna ................. G06F 3/0416 |
| | | | 345/173 |
| 9,069,427 | B2 * | 6/2015 | Wu ........................ G06F 3/044 |
| 9,195,342 | B2 * | 11/2015 | Kim ...................... G06F 3/0418 |
| 9,244,572 | B2 * | 1/2016 | Singh ..................... G06F 3/044 |
| 2010/0328262 | A1 * | 12/2010 | Huang et al. .................. 345/174 |

(Continued)

FOREIGN PATENT DOCUMENTS

TW M425329 3/2012
TW 201248475 12/2012

OTHER PUBLICATIONS

"Office Action of Taiwan Counterpart Application", issued on Oct. 20, 2014, p. 1-p. 9.

*Primary Examiner* — Lun-Yi Lao
*Assistant Examiner* — Peter D McLoone
(74) *Attorney, Agent, or Firm* — Jianq Chyun IP Office

(57) ABSTRACT

A touching apparatus and a touching detecting method thereof are provided. The touching detecting method is adapted for a touch panel. The touch panel has a plurality of touching rows and a plurality of touching columns. The touching detecting method includes: performing a mutual-capacitor touching detection and a self-capacitor touching detection alternatingly to the touch panel for obtaining a mutual-capacitor detection result and a self-capacitor detection result, respectively; and obtaining position information of at least one touch point on the touch panel by an operation based on the mutual-capacitor detection result and the self-capacitor detection result.

10 Claims, 8 Drawing Sheets

(56) References Cited

U.S. PATENT DOCUMENTS

| | | | |
|---|---|---|---|
| 2011/0007021 A1* | 1/2011 | Bernstein et al. | 345/174 |
| 2011/0084929 A1* | 4/2011 | Chang et al. | 345/173 |
| 2011/0157068 A1* | 6/2011 | Parker et al. | 345/174 |
| 2011/0175835 A1* | 7/2011 | Wang | 345/173 |
| 2012/0050333 A1* | 3/2012 | Bernstein | 345/660 |
| 2012/0113047 A1* | 5/2012 | Hanauer et al. | 345/174 |
| 2012/0274604 A1 | 11/2012 | Norton et al. | |
| 2013/0063396 A1 | 3/2013 | Kim et al. | |
| 2013/0093711 A1* | 4/2013 | Liu | G06F 3/044 345/174 |
| 2013/0154996 A1* | 6/2013 | Trend et al. | 345/174 |
| 2013/0162583 A1* | 6/2013 | Simmons | G06F 3/044 345/174 |
| 2013/0257797 A1* | 10/2013 | Wu et al. | 345/174 |
| 2013/0293507 A1* | 11/2013 | Singh | G06F 3/044 345/174 |
| 2013/0307823 A1* | 11/2013 | Grivna | G06F 3/0416 345/174 |
| 2014/0022213 A1* | 1/2014 | Chang et al. | 345/174 |
| 2014/0078096 A1* | 3/2014 | Tan et al. | 345/174 |
| 2015/0049043 A1* | 2/2015 | Yousefpor | 345/174 |
| 2015/0049044 A1* | 2/2015 | Yousefpor et al. | 345/174 |
| 2015/0077394 A1* | 3/2015 | Dai et al. | 345/174 |
| 2015/0091847 A1* | 4/2015 | Chang | 345/174 |

* cited by examiner

TOUCHING APPARATUS AND TOUCHING DETECTING METHOD THEREOF

CROSS-REFERENCE TO RELATED APPLICATION

This application claims the priority benefit of Taiwan application serial no. 102109293, filed on Mar. 15, 2013. The entirety of the above-mentioned patent application is hereby incorporated by reference herein and made a part of this specification.

BACKGROUND OF THE INVENTION

1. Field of the Invention

The invention relates to a touching apparatus and a touching detecting method thereof and more particularly relates to a touching apparatus for performing a hybrid touching detecting method.

2. Description of Related Art

With advancement of electronic technologies, electronic devices have become an indispensable tool in our daily lives. In order to enhance usage convenience of electronic devices, operating electronic products by using a touch panel has become a main stream for electronic products. Therefore, fast and accurately detecting touching operations performed by the user on electronic products is an important issue for electronic products at this stage.

In a conventional touching apparatus, when a controller detects whether there is a touching event, it is mostly done by scanning one by one on each touch channel or each of intersections between touch pads. As multi-point touching function has become a necessary requirement today, a touching detecting method for said function may only be achieved by accelerating a scan frequency for the touching detecting. However, as the size of touch panel gradually increases each day, the scan frequency is also required to be further enhanced. Accordingly, complexity in calculation for detecting a touch point may be increased while a missed detection of the touch point may also occur. In view of forging, it is an important issue for designer in the field to effectively enhance the accuracy of the touching detecting.

SUMMARY OF THE INVENTION

The invention directs to a touch panel and a touching detecting method for the same, which may perform a more effective detections for multi-point touch without increasing scan frequency thereto.

The invention provides a touching detecting method adapted for a touch panel, in which the touch panel has a plurality of touching rows and a plurality of touching columns. The touching detecting method includes: performing a mutual-capacitor touching detection and a self-capacitor touching detection alternatingly to the touch panel for obtaining a mutual-capacitor detection result and a self-capacitor detection result, respectively; and obtaining position information of at least one touch point on the touch panel by an operation based on the mutual-capacitor detection result and the self-capacitor detection result.

In the touching detecting method according to an embodiment of the invention, the step of performing the mutual-capacitor touching detection includes the following steps. Setting the touching rows or the touching columns as a plurality of driving channels, and setting the touching rows or the touching columns not set as the plurality of driving channels as a plurality of detecting channels. Providing a driving signal sequentially and respectively to the plurality of driving channels, and obtaining a plurality of mutual-capacitor capacitance variations sequentially and respectively through the detecting channels. Generating the mutual-capacitor detection result based on the mutual-capacitor capacitance variations. Measuring capacitance variations for the touching rows and the touching columns sequentially, so as to obtain a plurality of self-capacitor capacitance variations. Generating the self-capacitor detection result based on the self-capacitor capacitance variations.

According to an embodiment of the invention, the touching detecting method further includes the following steps. Determining whether none of absolute values of the plurality of mutual-capacitor capacitance variations included in the mutual-capacitor detection result falls within an invalid detecting range after the step of performing the mutual-capacitor touching detection is completed. Performing the mutual-capacitor touching detection continuously if none of the absolute values of the mutual-capacitor capacitance variations falls within the invalid detecting range. Performing the self-capacitor touching detection if at least one of the absolute values of the mutual-capacitor capacitance variations falls within the invalid detecting range.

According to the present embodiment of the invention, the touching detecting method further includes the following steps. Determining whether none of absolute values of the plurality of mutual-capacitor capacitance variations included in the mutual-capacitor detection result falls within an invalid detecting range and detecting whether an amount of the touch point on the touch panel is 1 after the step of performing the mutual-capacitor touching detection is completed. Performing the mutual-capacitor touching detection continuously if none of the absolute values of the mutual-capacitor capacitance variations falls within the invalid detecting range and the amount of the touch point on the touch panel is not 1 Performing the self-capacitor touching detection if the absolute values of the plurality of mutual-capacitor capacitance variations falls within the invalid detecting range and/or the amount of the at least one touch point is 1.

According to the present embodiment of the invention, the touching detecting method further includes the following steps. Detecting whether the amount of the touch point is 1 after the step of performing the self-capacitor touching detection is completed. Performing the self-capacitor touching detection continuously if the amount of the touch point is 1. Performing the mutual-capacitor touching detection if the amount of the at least one touch point is not 1.

The touch apparatus of the invention includes a touch panel and a controller. The touch panel has a plurality of touching rows and a plurality of columns. The controller is coupled to the touch panel, the controller performs a mutual-capacitor touching detection and a self-capacitor touching detection alternatingly to the touch panel for obtaining a mutual-capacitor detection result and a self-capacitor detection result, respectively; and obtains position information of at least one touch point on the touch panel by performing an operation based on the mutual-capacitor detection result and the self-capacitor detection result.

Based on above, the invention performs a cross detection for the touch point on the touch panel by exchanging between the mutual-capacitor touching detection and the self-capacitor touching detection. Accordingly, possible touch points which may occur on the touch panel may be favorably detected by using a hybrid method of the mutual-capacitor touching detection and the self-capacitor touching detection, this allows the touching functions provided by the touch apparatus to be much more accurate, so as to increase the effectiveness of a system to which it belongs.

To make the above features and advantages of the invention more comprehensible, several embodiments accompanied with drawings are described in detail as follows.

DESCRIPTION OF THE EMBODIMENTS

Figure 1:
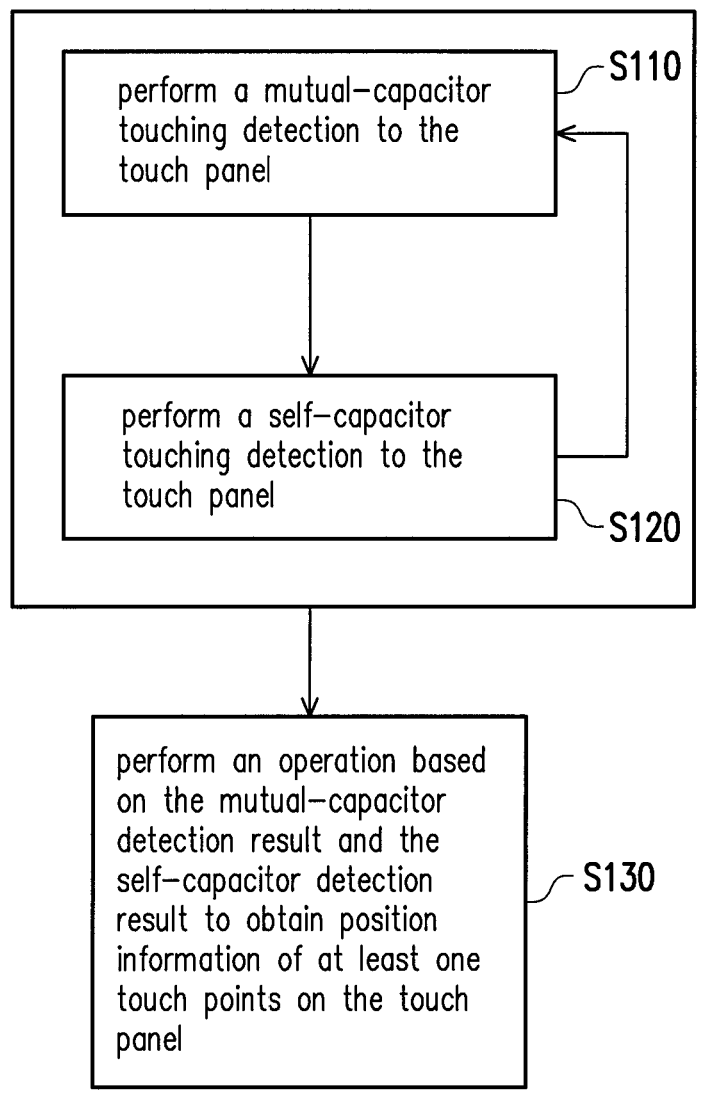
FIG. 1 is a schematic flowchart illustrating a touching detecting method according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a schematic flowchart illustrating a touching detecting method according to an embodiment of the invention. The touching detecting method of the present embodiment is adapted for a touch panel. The touching detecting method includes the following steps. In step S110, a mutual-capacitor touching detection is performed to the touch panel. Next, in step S120, a self-capacitor touching detection is performed to the touch panel. A mutual-capacitor detection result and a self-capacitor detection result are obtained respectively by the mutual-capacitor touching detection performed in step S110 and the self-capacitor touching detection performed in step S120. In step S130, an operation is performed based on the mutual-capacitor detection result and the self-capacitor detection result performed in step S110 and S120, respectively, so as to obtain position information of one or more touch points occurred on the touch panel.

It should be noted that, the mutual-capacitor touching detection performed in step S110 and the self-capacitor touching detection performed in S120 are performed alternatingly and continuously. The mutual-capacitor touching detection and the self-capacitor touching detection being continuously performed are provided for performing step S130, so as to instantly determine the status of the latest status of the touch point occurred on the touch panel.

More specifically, in the touching detecting method proposed by the present embodiment, the mutual-capacitor touching detection is performed to the touch panel so as to obtain the position information of most of the touch points. As for the position information of the touch points which cannot be easily detected, the self-capacitor touching detection may be utilized to accurately detect the position information of the touch points which cannot be easily detected. The touch points which cannot be easily detected as described above may be generated owing to a poor condition of a common ground between a user and the touch panel.

Figure 2A:
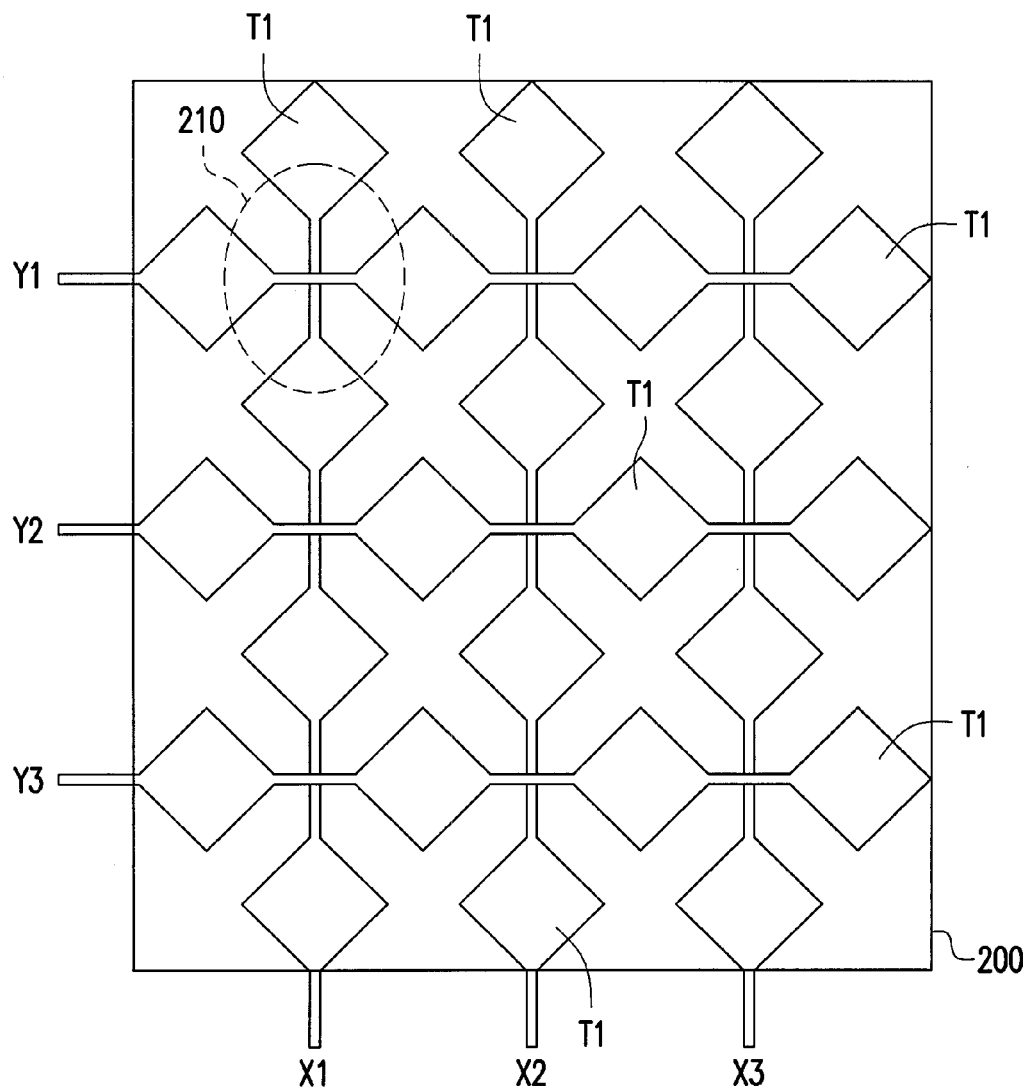
FIG. 2A to FIG. 2C are schematic diagrams illustrating implementations of a mutual-capacitor touching detection according to embodiments of the invention.
Figure 2B:
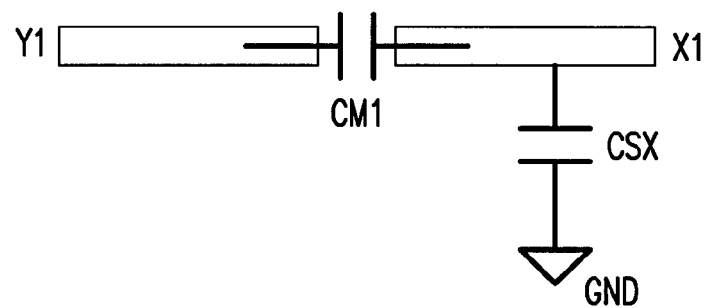
Figure 2C:
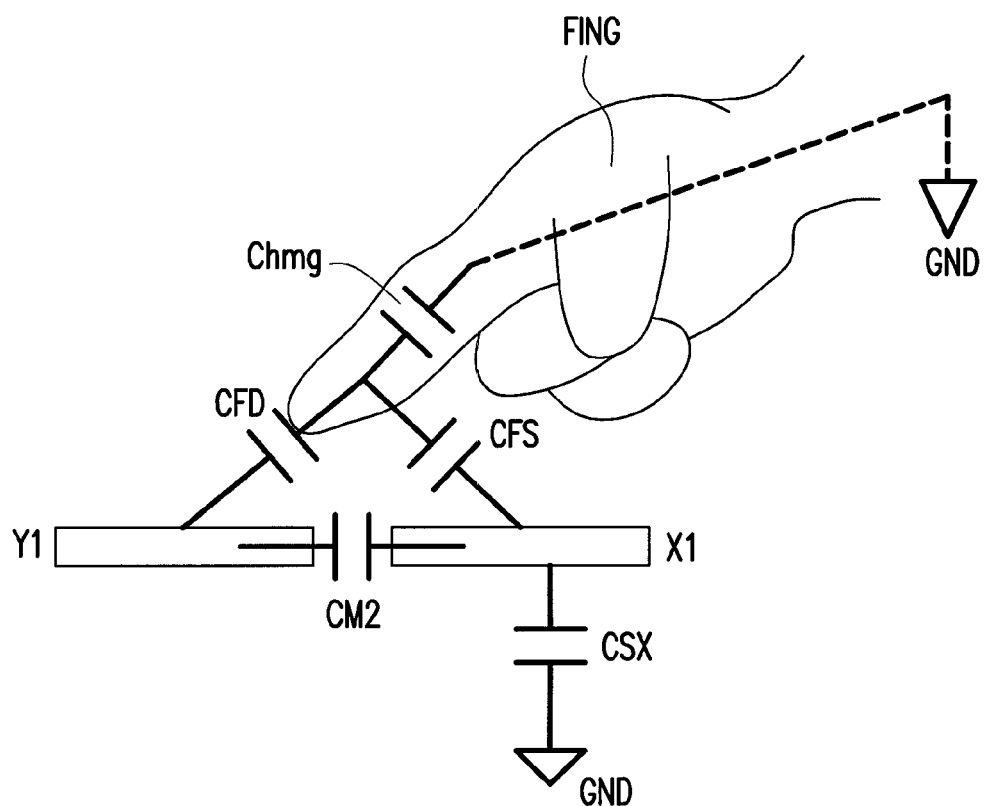

For details regarding the mutual-capacitor touching detection according to the present embodiment, referring to FIG. 2A to FIG. 2C. FIG. 2A to FIG. 2C are schematic diagrams illustrating implementations of a mutual-capacitor touching detection according to embodiments of the invention. In FIG. 2A, a touch panel 200 includes a plurality of touch pads T1 arranged in a matrix shape and forms a plurality of touching rows X1 to X3 and a plurality of touching columns Y1 to Y3. When the mutual-capacitor touching detection is performed, the touching rows X1 to X3 and the touching columns Y1 to Y3 may be set as a plurality of driving channels and a plurality of detecting channels, respectively. Alternatingly, the touching rows X1 to X3 and the touching columns Y1 to Y3 may be set as the plurality of detecting channels and the plurality of driving channels, respectively. Taking the touching columns Y1 to Y3 set as the plurality of driving channel for example, the touching rows X1 to X3 are then set as the plurality of detecting channels. While the touching columns Y1 to Y3 set as the driving channels are provided with the driving signals respectively, the touching rows X1 to X3 set as the detecting channels are utilized as channels for obtaining mutual-capacitor capacitance variations between the driving channels provided with the driving signal and the detecting channels.

Taking the touching column Y1 provided with the driving signal for example, when the touching row X1 is set as the detecting channel, the mutual-capacitor capacitance variation in an area 210 may be obtained. By using the mutual-capacitor capacitance variation obtained by the touching row X1, it can be known whether the area 210 is touched.

Referring to FIG. 2B and FIG. 2C together, in FIG. 2B, when the area 210 is not touched, a mutual-capacitor capacitance CM1 is provided between the touching column Y1 set as the driving channel and the touching row X1 set as the detecting channel, while a capacitance CSX is provided between the touching row X1 and the ground terminal GND. In FIG. 2C, when a finger FING touches the touching column Y1 and the touching row X1 (i.e., the area 210), a capacitance Chmg of the finger FING, a capacitance CFD generated between the finger FING and the touching column Y1 and a capacitance CFS generated between the finger FING and the touching row X1 may change a mutual-capacitor capacitance CM2 provided between the touching column Y1 and the touching row X1 set as the detecting channel. Among them, a capacitance value of the mutual-capacitor capacitance CM2 is less than a capacitance value of the mutual-capacitor capacitance CM1.

In addition, the common ground as described above refers to whether a voltage level of the ground terminal GND connected to the capacitance Chmg of the finger FING is identical to a voltage level of the ground terminal GND coupled to the touching row X1 through the capacitance CSX. For instance, in a case where the touch panel is placed by the user on a desktop while the user is standing on the ground, the ground terminal GND connected to the capacitance Chmg of the finger FING is coupled to the ground terminal through a body of the user. In that case, the poor condition of the common ground may occur between the finger FING and the touch panel. When the poor condition of the common ground occurs between the finger FING and the touch panel, the mutual-capacitor capacitance variation generated by the finger FING touching the touch panel is dramatically reduced, such that the touch point cannot be easily detected.

Figure 3A:
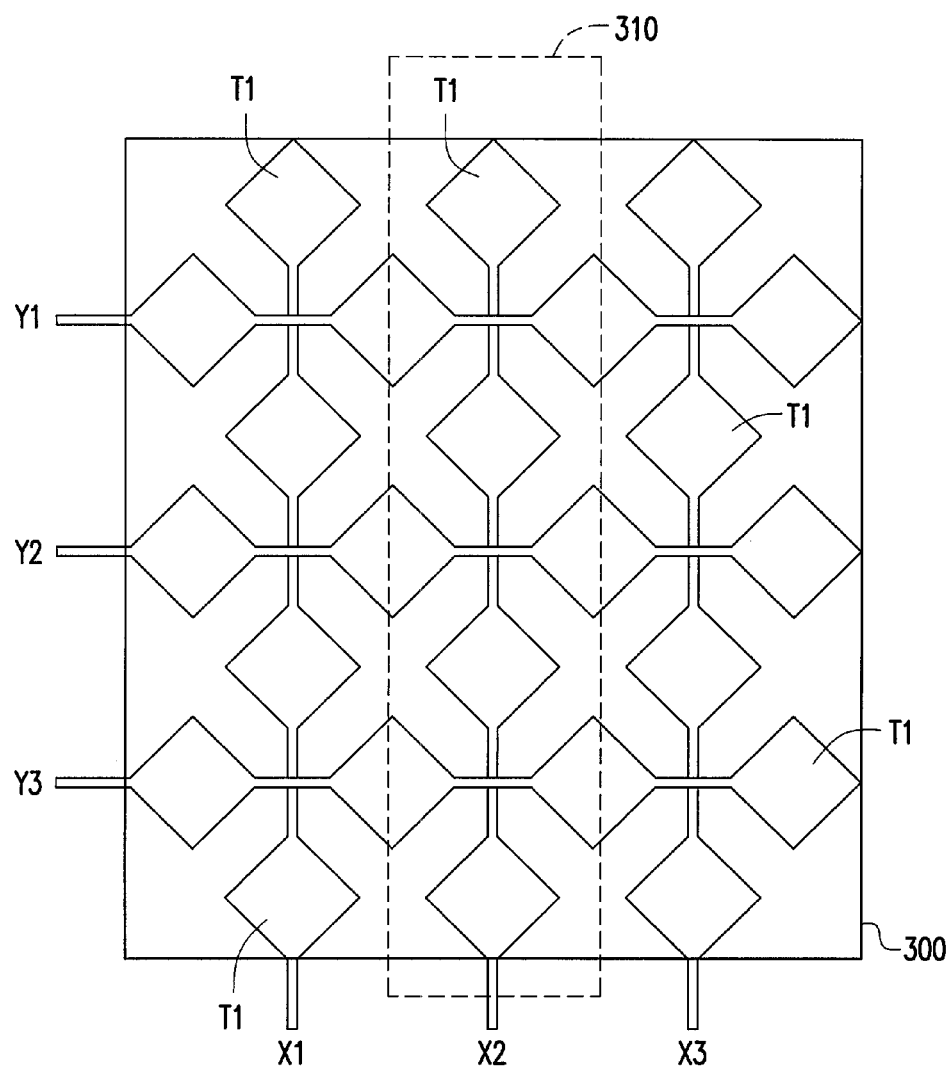
FIG. 3A to FIG. 3C are schematic diagrams illustrating implementations of a self-capacitor touching detection according to embodiments of the invention.
Figure 3B:
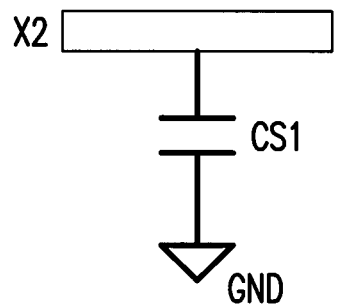
Figure 3C:
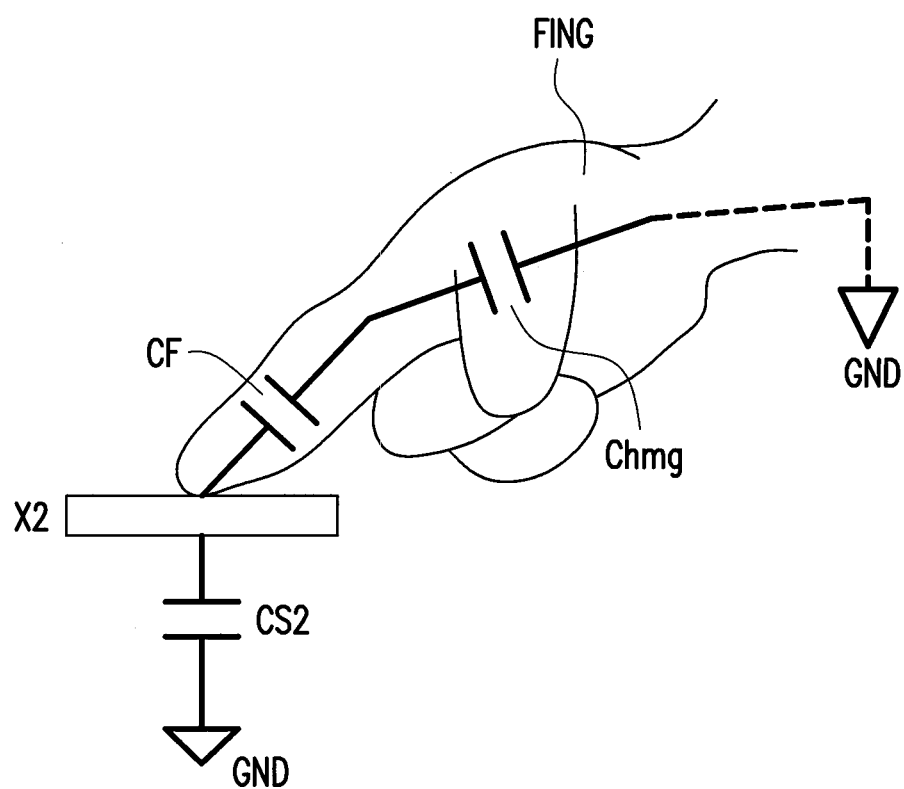

For details regarding the self-capacitor touching detection according to the present embodiment, referring to FIG. 3A to FIG. 3C. FIG. 3A to FIG. 3C are schematic diagrams illustrating implementations of a self-capacitor touching detection according to embodiments of the invention. In FIG. 3A, a touch panel 300 also includes a plurality of touch pads T1 arranged in a matrix shape and forms a plurality of touching rows X1 to X3 and a plurality of touching columns Y1 to Y3. When the self-capacitor touching detection is performed to the touch panel 300, capacitance variations for the touching rows X1 to X3 and the touching columns Y1 to Y3 may be measured sequentially, so as to obtain a plurality of self-capacitor capacitance variations. Taking the capacitance variation of the touching row X2 for example, a touching status of an area 310 may be obtained by measuring the self-capacitor capacitance variation of the touching row X2. Referring to FIG. 3B and FIG. 3C together, in FIG. 3B, when the area 310 is not touched, the touching row X2 is coupled to the ground terminal GND through a self-capacitor capacitance CS1. In FIG. 3C, when the area 310 is touched by the finger FING, a capacitance CF between the finger FING and the touching row X2, and a capacitance Chmg of the finger FING may change the touching row X2 to be coupled to the ground terminal GND through a self-capacitor capacitance CS2.

It is apparent from the above descriptions that, the position information of the touch point may be obtained by detecting the self-capacitor capacitance variation between each touching row and each touching column.

Figure 4A:
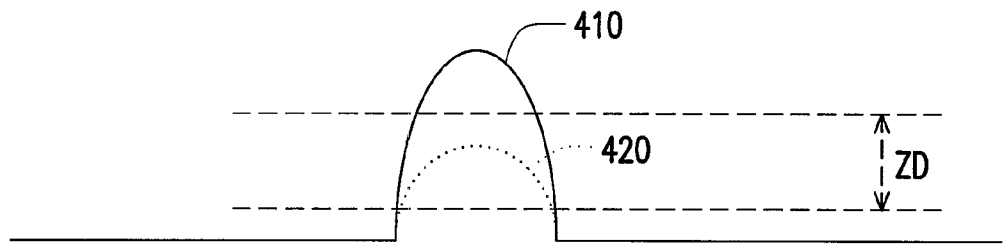
FIG. 4A and FIG. 4B are schematic diagrams illustrating capacitance variations according to embodiments of the invention.
Figure 4B:
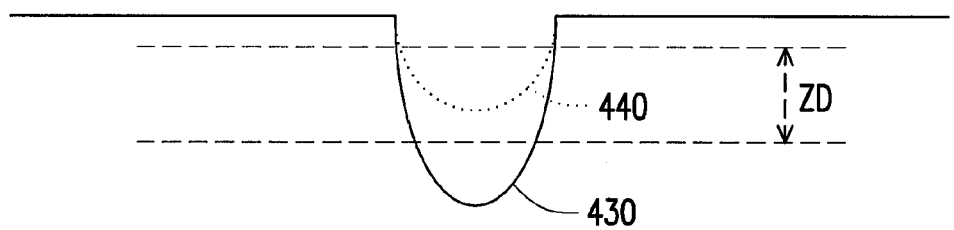

Referring to FIG. 4A and FIG. 4B, FIG. 4A and FIG. 4B are schematic diagrams illustrating capacitance variations according to embodiments of the invention. In FIG. 4A, a maximum value of a capacitance variation in a curve 410 exceeds an invalid detecting range ZD, which indicates that the touch point detected belongs to a touch point which can be validly detected. In contrast, a maximum value of a capacitance variation in a curve 420 falls within the invalid detecting range ZD, which indicates that the touch point detected belongs to a touch point which cannot be easily detected. On the other hand, a value of the capacitance variation may be less than 0 in FIG. 4B. In FIG. 4, a maximum value of a capacitance variation in a curve 430 is less than 0, and an absolute value thereof exceeds the invalid detecting range ZD, which indicates that the touch point detected belongs to a touch point which can be validly detected. In contrast, when a maximum value of a capacitance variation in a curve 440 is less than 0, and an absolute value thereof falls within the invalid detecting range ZD, which indicates that the touch point detected belongs to a touch point which cannot be easily detected.

It should be noted that, the detecting method for variations regarding the self-capacitor capacitance and the mutual-capacitor capacitance belongs to a technology well-known by person skilled in the art. That is to say, any capacitance detecting methods for the touch panel in conventional technology may be applied in the invention.

Figure 5:
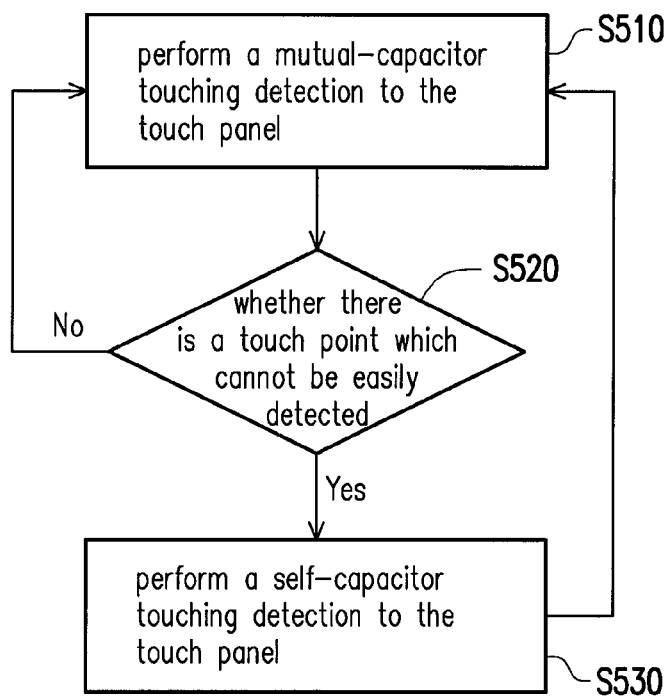
FIG. 5 is a flowchart illustrating a touching detecting method according to another embodiment of the invention.

Referring to FIG. 5, FIG. 5 is a schematic flowchart illustrating a touching detecting method according to another embodiment of the invention. According to the touching detecting method of the present embodiment, a mutual-capacitor touching detection is performed to the touch panel in step S510, and in step S520, it is determined whether a touch point which cannot be easily detected in the mutual-capacitor touching detection performed in step S510. That is, whether at least one of the mutual-capacitor capacitance variations falls within the invalid detecting range is detected. Once it is detected that the touch point cannot be easily detected, step S530 is performed so as to perform a self-capacitor touching detection to the touch panel, in case when the touch point which cannot be easily detected is not detected in step S520, the mutual-capacitor touching detection is continuously performed in step S510.

It is apparent from the above descriptions that in the present embodiment, the touching detecting method can be selected and switched instantly, so a better touching detecting method may be selected in respond to the current condition, such that the accuracy of the touching detection may be enhanced.

Figure 6:
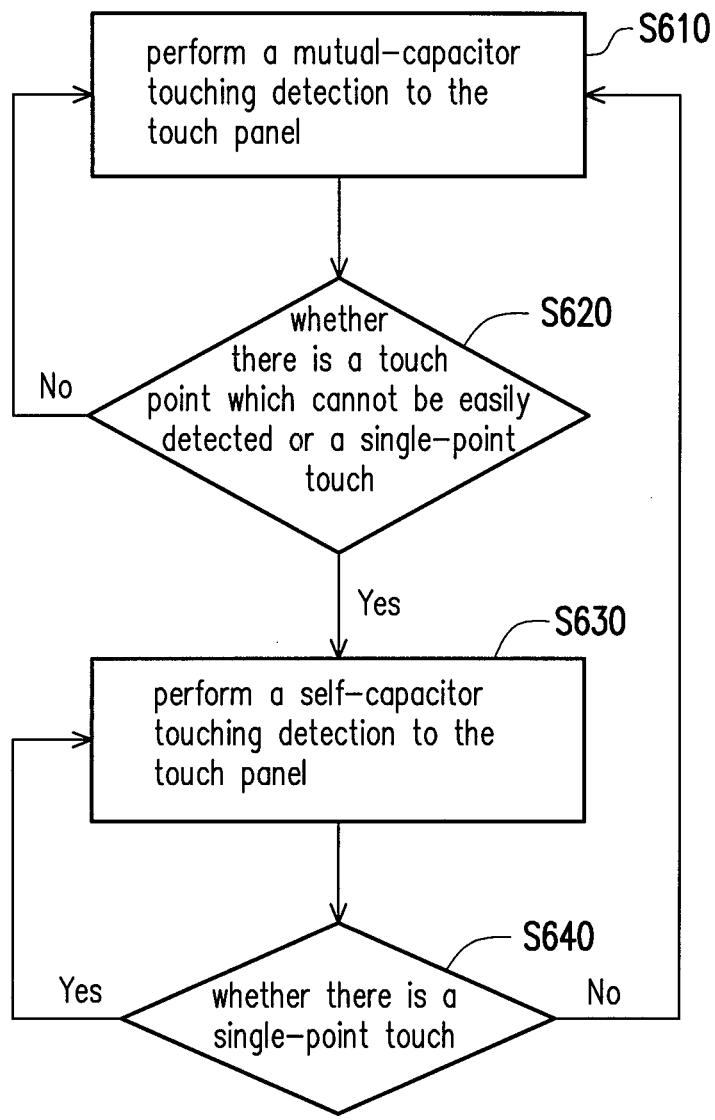
FIG. 6 is a flowchart illustrating a touching detecting method according to yet another embodiment of the invention.

Referring to FIG. 6, FIG. 6 is a schematic flowchart illustrating a touching detecting method according to yet another embodiment of the invention. According to the touching detecting method of the present embodiment, a mutual-capacitor touching detection is performed to the touch panel in step S610, and in step S620, it is determined whether a touch point which cannot be easily detected in the mutual-capacitor touching detection performed in step S610. Moreover, it is determined that whether a single-point touch is occurred on the touch panel at this stage. When it is determined that the touch point cannot be easily detected in step S620, a self-capacitor touching detection is performed to the touch panel in step S630. Or, when it is determined that an amount of the touch point on the touch panel is equal to 1 (i.e., detecting the single-point touch) in step S620, a self-capacitor touching detection may also be perform to the touch panel in step S630. In contrast, if it is determined that the single-point touch is not occurred on the touch panel in step S620, and the touch point which cannot be easily detected is not founded in the mutual-capacitor touching detection performed in step S620, step S610 is then continuously performed.

In addition, after step S630 is completed, the present embodiment further performs step S640 in which it is determined once again that whether a single-point touch is occurred on the touch panel. When it is determined that the single-point touch is occurred on the touch panel in step S640, step S630 is then continuously performed to perform a self-capacitor touching detection on the touch panel.

In the present embodiment, if the touch point cannot be easily detected when the mutual-capacitor touching detection is performed; the touching detecting method is changed to the self-capacitor touching detection. In addition, when the single-point touch is occurred on the touch panel, the touching detecting method may also be changed to the self-capacitor touching detection which is more suitable for detecting the touch point. In other words, in the present embodiment, the mutual-capacitor touching detection and the self-capacitor touching detection may be selected based on actual touching status on the touch panel, so as to effectively enhance the accuracy for detecting the touch point.

Figure 7:
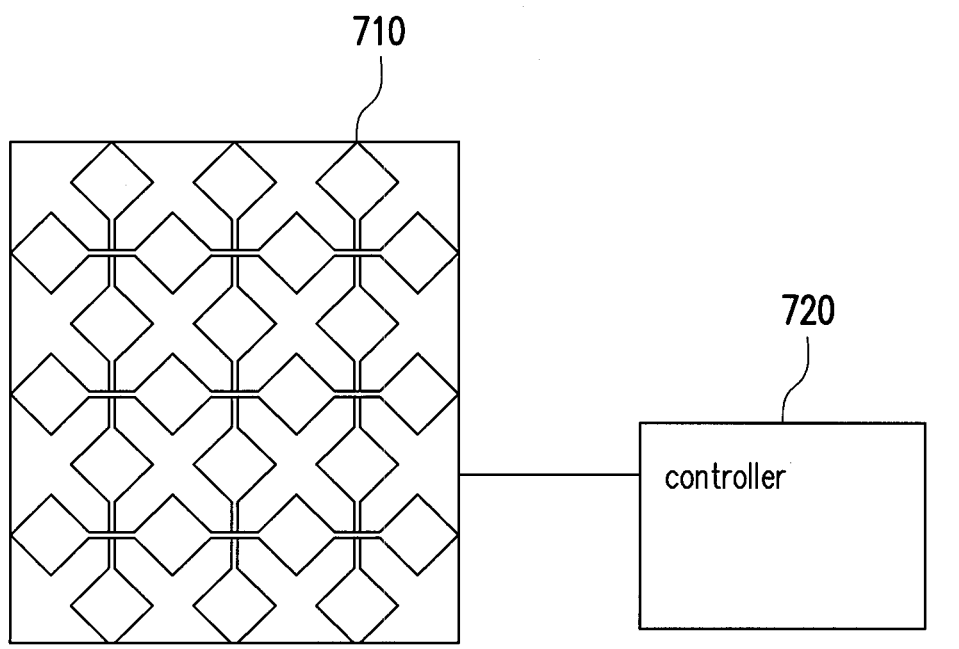
FIG. 7 is a schematic diagram illustrating a touch apparatus 700 according to an embodiment of the invention.

Referring to FIG. 7, FIG. 7 is a schematic diagram illustrating a touch apparatus 700 according to an embodiment of the invention. The touch apparatus 700 includes a touch panel 710 and a controller 720. The touch apparatus 700 includes a plurality of touching rows and a plurality of touching columns, and the controller 720 is coupled to the touch panel 710. The controller 720 performs a mutual-capacitor touching detection and a self-capacitor touching detection alternatingly to the touch panel 710 for obtaining a mutual-capacitor detection result and a self-capacitor detection result, respectively. The controller 720 obtains position information of at least one touch point on the touch panel 710 by performing an operation based on the mutual-capacitor detection result and the self-capacitor detection result.

Specific details regarding the mutual-capacitor touching detection and the self-capacitor touching detection performed and determined by the controller 720 are as described in the embodiments above, so it is omitted hereinafter.

In view of above, the invention provides a hybrid method of the mutual-capacitor touching detection and the self-capacitor touching detection, so as to perform detections in respond to many possible situations of the touch points generated on the touch panel. As a result, regardless of whether it is a single-point touch or multi-point touch, the touch point may be detected by using the touching detecting method according to the invention. In addition, as for the touch point which cannot be easily detected by using the mutual-capacitor touching detection, it may be detected by using the self-capacitor touching detection, so as to lower the possibility for missing the touch point.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touching detecting method for a touch panel having a plurality of touching rows and a plurality of touching columns, the method comprises:
    performing a mutual-capacitor touching detection and a self-capacitor touching detection alternatingly to the touch panel for obtaining a mutual-capacitor detection result and a self-capacitor detection result, respectively;
    obtaining position information of at least one touch point on the touch panel by performing an operation based on the mutual-capacitor detection result and the self-capacitor detection result;
    determining whether none of absolute values of the plurality of mutual-capacitor capacitance variations included in the mutual-capacitor detection result falls within an invalid detecting range after the step of performing the mutual-capacitor touching detection is completed;
    performing the mutual-capacitor touching detection continuously merely when none of the absolute values of the plurality of mutual-capacitor capacitance variations falls within the invalid detecting range; and
    performing the self-capacitor touching detection merely when at least one of the absolute values of the plurality of mutual-capacitor capacitance variations falls within the invalid detecting range.

2. The touching detecting method of claim 1, wherein the step of performing the mutual-capacitor touching detection comprises:
    setting the plurality of touching rows or the plurality of touching columns as a plurality of driving channels, and setting the plurality of touching rows or the plurality of touching columns not set as the plurality of driving channels as a plurality of detecting channels;
    providing a driving signal sequentially and respectively to the plurality of driving channels, and obtaining a plurality of mutual-capacitor capacitance variations sequentially and respectively through the plurality of detecting channels; and
    generating the mutual-capacitor detection result based on the plurality of mutual-capacitor capacitance variations.

3. The touching detecting method of claim 1, wherein the step of performing the self-capacitor touching detection comprises:
    measuring capacitance variations for the plurality of touching rows and the plurality of touching columns sequentially to obtain a plurality of self-capacitor capacitance variations; and
    generating the self-capacitor detection result based on the plurality of self-capacitor capacitance variations.

4. A touch apparatus, comprising:
    a touch panel having a plurality of touching rows and a plurality of columns; and
    a controller coupled to the touch panel, the controller performing a mutual-capacitor touching detection and a self-capacitor touching detection alternatingly to the touch panel for obtaining a mutual-capacitor detection result and a self-capacitor detection result, respectively; the controller obtaining position information of at least one touch point on the touch panel by performing an operation based on the mutual-capacitor detection result and the self-capacitor detection result; the controller determining whether none of absolute values of the plurality of mutual-capacitor capacitance variations included in the mutual-capacitor detection result falls within an invalid detecting range after the mutual-capacitor touching detection is performed and completed; the controller performing the mutual-capacitor touching detection continuously merely when none of the absolute values of the plurality of mutual-capacitor capacitance variations falls within the invalid detecting range; and the controller performing the self-capacitor touching detection merely when at least one of the absolute values of the plurality of mutual-capacitor capacitance variations falls within the invalid detecting range.

5. The touch apparatus of claim 4, wherein when the mutual-capacitor touching detection is performed, the controller sets the plurality of touching rows or the plurality of touching columns as a plurality of driving channels, and sets the plurality of touching rows or the plurality of touching columns not set as the plurality of driving channels as a plurality of detecting channels; and the controller provides a driving signal sequentially and respectively to the plurality of driving channels, and obtains a plurality of mutual-capacitor capacitance variations sequentially and respectively through the plurality of detecting channels; and the controller generates the mutual-capacitor detection result based on the plurality of mutual-capacitor capacitance variations.

6. The touch apparatus of claim 4, wherein when the self-capacitor touching detection is performed, the controller measures capacitance variations for the plurality of touching rows and the plurality of touching columns sequentially, so as to obtain a plurality of self-capacitor capacitance variations; and the controller generates the self-capacitor detection result based on the plurality of self-capacitor capacitance variations.

7. A touching detecting method for a touch panel having a plurality of touching rows and a plurality of touching columns, the method comprises:
    performing a mutual-capacitor touching detection and a self-capacitor touching detection alternatively to the touch panel for obtaining a mutual-capacitor detection result and a self-capacitor detection result, respectively;
    obtaining position information of at least one touch point on the touch panel by performing an operation based on the mutual-capacitor detection result and the self-capacitor detection result;
    determining whether none of absolute values of the plurality of mutual-capacitor capacitance variations included in the mutual-capacitor detection result falls within an invalid detecting range and detecting whether an amount of the least one touch point on the touch panel is 1 after the step of performing the mutual-capacitor touching detection is completed;

performing the mutual-capacitor touching detection continuously merely when none of the absolute values of the plurality of mutual-capacitor capacitance variations falls within the invalid detecting range and the amount of the least one touch point on the touch panel is not 1; and
performing the self-capacitor touching detection merely when at least one of the absolute values of the plurality of mutual-capacitor capacitance variations falls within the invalid detecting range and/or the amount of the at least one touch point is 1.

8. The touching detecting method of claim 7, further comprising:
detecting whether the amount of the at least one touch point is 1 after the step of performing the self-capacitor touching detection is completed;
performing the self-capacitor touching detection continuously merely when the amount of the at least one touch point is 1; and
performing the mutual-capacitor touching detection merely when the amount of the at least one touch point is not 1.

9. A touch apparatus, comprising:
a touch panel having a plurality of touching rows and a plurality of columns; and
a controller coupled to the touch panel, the controller performing a mutual-capacitor touching detection and a self-capacitor touching detection alternatingly to the touch panel for obtaining a mutual-capacitor detection result and a self-capacitor detection result, respectively; the controller obtaining position information of at least one touch point on the touch panel by performing an operation based on the mutual-capacitor detection result and the self-capacitor detection result; the controller determining whether none of absolute values of the plurality of mutual-capacitor capacitance variations included in the mutual-capacitor detection result falls within an invalid detecting range, and detecting whether an amount of the least one touch point on the touch panel is 1 after the mutual-capacitor touching detection is performed and completed; the controller performing the mutual-capacitor touching detection continuously merely when none of the absolute values of the plurality of mutual-capacitor capacitance variations falls within the invalid detecting range and the amount of the least one touch point on the touch panel is not 1; and the controller performing the self-capacitor touching detection merely when at least one of the absolute values of the plurality of mutual-capacitor capacitance variations falls within the invalid detecting range and/or the amount of the at least one touch point is 1.

10. The touch apparatus of claim 9, wherein after the self-capacitor touching detection is performed and completed, the controller detects whether the amount of the at least one touch point is 1; the controller performs the self-capacitor touching detection continuously merely when the amount of the at least one touch point is 1; and the controller performs the mutual-capacitor touching detection merely when the amount of the at least one touch point is not 1.

* * * * *